Jan. 1, 1957 H. C. BROWN 2,776,231
SEGMENTED INSULATING COVERING FOR PIPES AND THE LIKE
Filed June 28, 1954
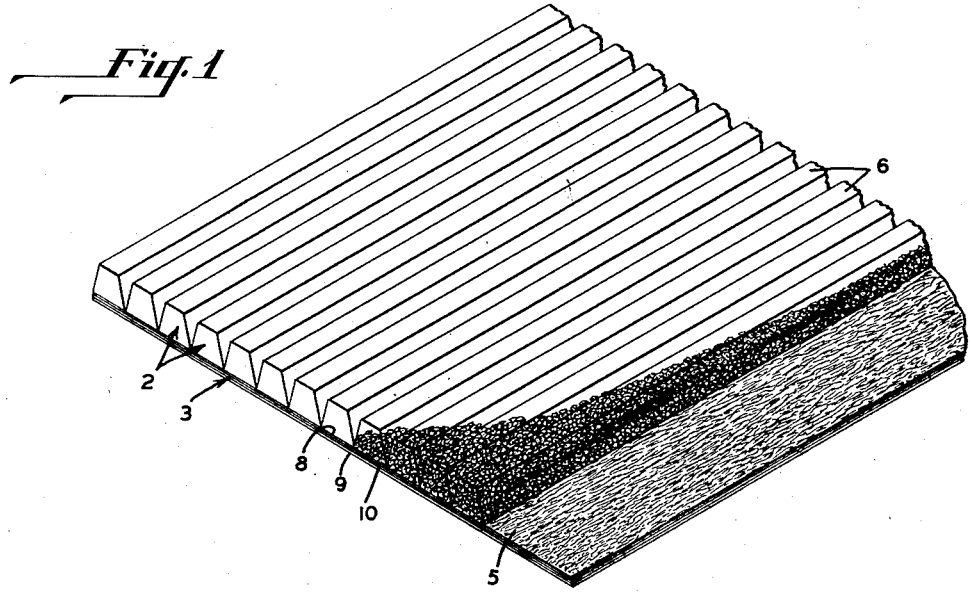
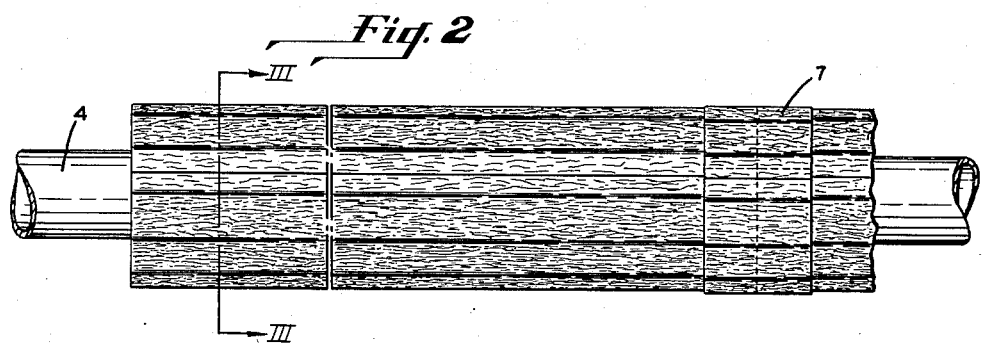
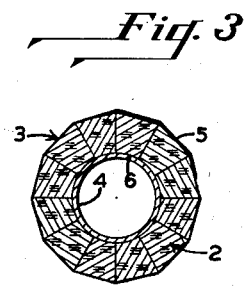
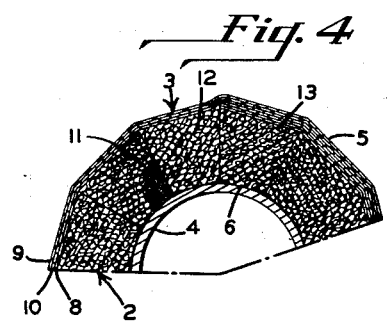
INVENTOR
HENRY C. BROWN
ATTORNEY United States Patent Office 2,776,231
Patented Jan. 1, 1957

2,776,231

SEGMENTED INSULATING COVERING FOR PIPES AND THE LIKE

Henry C. Brown, East Hempfield Township, Lancaster County, Pa., assignor to Armstrong Cork Company, Lancaster, Pa., a corporation of Pennsylvania Application June 28, 1954, Serial No. 439,707

5 Claims. (Cl. 154—44)

The present invention relates to a segmented thermal insulating covering for pipes and the like and is concerned more particularly with the problem of preventing cold spots in segmented insulation materials which might occur where voids or open joints between segments may be present.

It is customary to insulate chilled water lines, dual temperature air-conditioning lines, and other cold lines with insulation materials, and molded cork pipe covering has been used widely for this purpose. It is generally molded into half sections adapted to surround the particular size of pipe to be covered, and the sections are disposed about the pipe and adhesively joined together. Wire ties or other fastening elements are generally employed to hold the pieces in position during setting of the adhesive and thereafter. Molded cork pipe covering is relatively expensive, requiring as it does special molds for each size of pipe to be insulated. Baked cork possesses many advantages in the insulation of cold lines, however, and consequently it is the material most commonly used for such service.

Instead of molding the cork insulation to the desired shape as in the production of molded cork pipe covering, the insulating covering of the present invention is fabricated from slabs or boards of baked cork, the slabs being cut into segments which are secured to a facing sheet and are so shaped that, when the material is wrapped around a pipe to be insulated, the various segments will abut one another and a continuous layer of baked cork insulation will be disposed around the pipe. The prefabricated insulation may be held in position by an adhesive applied to a flap provided on the facing sheet.

With an insulating covering of the segmented type, one of the problems is to eliminate sweating on the outer surface of the facing layer which results when the segments are not brought into abutting relationship in installation of the covering. This may occur if the mechanic installing the material is not careful and fails to draw the covering tightly around the pipe and, as a result, there is an open joint, particularly where the outermost segments of the insulation adjoin. The fact that the installation has not been made properly will not be evident from an inspection of the insulated cold line, for the facing sheet fully covers the segments and any improper fitting of the segments will not be visible at the outer surface. If the pipe to be insulated has a foreign coating thereon of considerable thickness, as might occur with a line being reinsulated and where the old covering has not been carefully removed, the increased circumference of the outer surface of the pipe to which the segmented insulation is to be applied may prevent the segments from being brought into firm contact and there may be open joints between most or all of the segment.

Sweating may also result when a corner or other portion is broken from a segment in fabrication, transportation, or installation. If the damage is not repaired prior to installation of the covering it will not be observed by inspection of the installed material, but when the system is put into use and the cold line reaches its reduced service temperature, condensation of moisture will most likely occur on the facing sheet over the damaged segment, particularly if the damage results in a void of substantial depth in the insulation.

While segmented baked cork pipe covering may be economically produced and may be installed with a minimum of labor, the hidden voids and open joints militate against its commercial acceptance.

It is a principal object of the present invention, therefore, to provide a segmented insulation which has built therein an arrangement which will satisfactorily eliminate the problems which result from the presence of voids and open joints, without detracting from the insulating efficiency of the covering.

According to the present invention there is provided at the outer surface of the covering, i. e., the portion remote from the pipe when the material is installed and in service, a membrane or its equivalent which surrounds substantially all of the segments and which has the characteristic of a high rate of heat conduction. This results in the rapid conduction of heat to all areas of the outer surface of the covering and the attainment of a substantially uniform temperature at such surface, regardless of any voids or open joints in the insulation which would otherwise provide "cold spots" at the surface of the facing sheet where condensation of moisture would occur. Preferably the heat-conducting membrane is incorporated into the facing sheet and is coextensive therewith to keep manufacturing costs and installation labor at a minimum.

In order that the invention may be readily understood, an embodiment thereof will be described in conjunction with the attached drawing, in which:

Figure 1 is a perspective view which has been broken away and illustrates a portion of segmented insulation material in its flat condition as fabricated and prior to installation;

Figure 2 is a front elevational view of the section of pipe having two sections of segmented covering of the type shown in Figure 1 applied thereto;

Figure 3 is a diagrammatic sectional view taken generally along the lines III—III of Figure 2 and drawn to a slightly reduced scale which illustrates the position assumed by the various segments of insulation material when properly installed and free of open joints and voids; and Figure 4 is a detailed sectional view to a somewhat enlarged scale showing the insulated structure of Figure 2, with one segment of the insulation having a piece broken therefrom, leaving a crevice or void therein.

In the embodiment of the invention illustrated in Figure 1, the pipe covering includes a plurality of segments 2 of baked cork of generally prismatic configuration having severed side faces mounted upon a facing sheet 3 of laminated construction. The segments 2 are preferably adhesively joined to the facing sheet 3. The layer of adhesive may be quite thin and has not been shown in the drawing. In the installation of this type of material in the manner shown in Figure 2 where a section of pipe 4 is to be insulated, the segmented insulation is wrapped around the pipe and the free end or flap 5 of the facing sheet 3 is coated with an adhesive and is lapped over the trailing edge of the facing sheet 3, as shown in Figure 4. The individual segments 2 are brought into good face-to-face contact with each other, with the lower faces 6 of the segments 2 each lying in contact with the pipe 4. A narrow strip 7 of material similar to the facing sheet 3 is preferably applied over the joint where two adjacent sections of the segmented insulation abut as shown in Figure 2, this strip preferably being adhesively secured in place. The ends of the segmented insulation sections are brought into firm contact with one another during installation of the covering and prior to application of the covering tape 7.

This provides a structure in which the pipe 4, which may carry cold water, brine, or other refrigerant, or may be a dual temperature air-conditioning line and carry refrigerating liquid during one cycle of operation of the unit and heating liquid during another cycle, is insulated by a layer formed of abutting segments of baked cork insulation.

In the embodiment of the invention shown in the drawing, the facing sheet 3 is in the nature of a composite web including a layer 8 which may be of 30-pound crinkled kraft paper. This layer provides a surface to which the segments 2 may be readily adhered. An outer or covering layer 9 is provided which may be of the same material as the layer 8. Both of these paper layers may be impregnated with a water-repellent substance such as a synthetic resin. This is particularly desirable in the covering layer 9 which may be exposed in service or may be coated with a decorative or weather-resistant paint or similar coating. Disposed between and adhesively secured to the layers 8 and 9, preferably by an asphalt or other waterproof adhesive, is a membrane 10 which is preferably aluminum foil 0.001" thick. This composite facing sheet provides a good vapor barrier, for any pinholes which may exist in the aluminum foil layer will be sealed with the asphalt adhesive. With a membrane of aluminum of greater thickness than the 0.001" foil mentioned above pinholing would not be a problem, but it is preferred to use a thin sheet and reinforce it with a paper layer or layers and seal any openings in the metal foil with the laminating adhesive, because the paper presents a surface which will receive and hold well the adhesive which secures the segments in position and the adhesive disposed at the flap and on the tape at the joints. Also, the paper provides a good surface for the application of a surface finish such as paint as mentioned above. The presence of the aluminum foil membrane 10 provides the desired heat conductivity in the facing sheet. Thus, should a void or crevice be inadvertently formed by breakage of a portion of a segment during transportation or in handling in installation, such as the crevice 11 shown in Figure 4, or an open joint occur between segments 12 and 13 because the covering is not properly drawn into position during installation, the membrane 10 which surrounds the entire outer surface of the insulation layer formed of the segments 2 will conduct heat rapidly to any area where an objectionable void or open joint may exist and rapidly will equalize the temperature which exists there with the temperature of the remainder of the facing sheet and condensation of moisture on the surface of the facing sheet will not occur. The insulating efficiency of the covering will not be impaired to any measurable extent by the presence of a chipped segment or improperly abutted segments.

As shown in Figure 4, the facing sheet 3, including the metal membrane 10, is completely insulated from the circular surface 4 by the cork segments 2.

While in the preferred embodiment of the invention the segments are formed of corkboard, the invention will be applicable to other types of segmented insulation, including segments which are formed of porous rubber, fiberboard, foamed glass, and the like. The problem is present in all types of segmented insulation materials, although some are more fragile than others. Also, while a three-ply laminated facing sheet has been illustrated, and as noted above is preferred because of the many advantages which flow from the use of such a multi-ply structure, one or both of the paper-facing plies may be eliminated. In place of a sheet of aluminum foil, a coating of heat-conductive material, such as aluminum flakes in a suitable carrier, may be applied to a suitable supporting web, such, for instance, as one of the paper layers 8 or 9. The heat-conductive layer whether in sheet form or in the nature of a coating should be essentially coextensive with the outer surface of the insulation layer so that regardless of where a crevice or open joint may occur, heat will be rapidly conducted to such area or areas.

I claim:

1. A prefabricated thermal insulating covering comprising a plurality of segments of rigid insulation material of generally prismatic configuration having severed side faces fabricated to form an essentially continuous layer of insulation surrounding a circular surface to be insulated when said insulation is wrapped therearound and said severed side faces of said segments are brought into abutting relationship and a vapor-proof facing to which said segments are adhesively secured in contiguous relationship, said facing including means for rapidly conducting heat to substantially the entire outer surface of said facing including the portion overlying the joint where the outermost segments of the cover abut to equalize the temperature at the surface thereof regardless of the presence of open joints between contiguous segments or voids in said layer of insulation and thereby avoid the condensation of moisture on the surface of said facing, said means comprising a membrane of thin, flexible, heat-conductive metal, which metal membrane is completely insulated from the circular surface by said segments of insulation material and which is substantially coextensive with the entire outer surface area of said segments and overlies all of the joints between contiguous segments and which includes an extending flap overlapping the joint where the outermost segments of the covering abut when the covering is installed and in service.

2. A prefabricated insulating covering in accordance with claim 1 in which the layer of heat-conductive metal is a membrane of aluminum foil.

3. A prefabricated insulating covering in accordance with claim 2 in which the facing comprises an adhesively laminated sheet including a layer of paper joined to the membrane of aluminum foil and constituting the exposed outer surface of said covering.

4. A prefabricated insulating covering in accordance with claim 1 in which the facing includes a membrane of metal foil interposed between inner and outer layers of paper which are adhesively joined to the foil and cover essentially the entire surface area thereof.

5. A prefabricated insulating covering in accordance with claim 1 in which the segments are formed of baked cork.

References Cited in the file of this patent

UNITED STATES PATENTS

| | | |
|---|---|---|
| 348,187 | Burns | Aug. 31, 1886 |
| 1,734,209 | Huffine | Nov. 5, 1929 |
| 1,838,242 | Wilson | Dec. 29, 1931 |
| 2,022,727 | Lee | Dec. 5, 1935 |
| 2,222,343 | Wasserman | Nov. 19, 1940 |
| 2,640,004 | Saun | May 26, 1953 |